(12) United States Patent
Gosselin et al.

(10) Patent No.: US 8,983,540 B2
(45) Date of Patent: Mar. 17, 2015

(54) DELIVERY OF CALLER IDENTIFICATION DATA TO A MOBILE DEVICE USING APPLICATION DIRECTED SHORT MESSAGING SERVICE

(75) Inventors: Mark H. Gosselin, Seattle, WA (US); Michael Luna, San Jose, CA (US)

(73) Assignee: Cequint, Inc., Seattle, WA (US)

( * ) Notice: Subject to any disclaimer, the term of this patent is extended or adjusted under 35 U.S.C. 154(b) by 540 days.

(21) Appl. No.: 12/349,679

(22) Filed: Jan. 7, 2009

(65) Prior Publication Data

US 2010/0075644 A1 Mar. 25, 2010

Related U.S. Application Data

(60) Provisional application No. 61/099,112, filed on Sep. 22, 2008.

(51) Int. Cl.
*H04W 68/00* (2009.01)
*H04M 3/42* (2006.01)
*H04W 72/00* (2009.01)
*H04W 4/12* (2009.01)

(52) U.S. Cl.
CPC ...... *H04M 3/42042* (2013.01); *H04M 3/42382* (2013.01); *H04M 2203/654* (2013.01); *H04M 2207/18* (2013.01); *H04W 4/12* (2013.01); *H04W 68/00* (2013.01)
USPC ............................ 455/558; 455/415; 455/466

(58) Field of Classification Search
USPC .................................... 455/41, 466, 415, 558
See application file for complete search history.

(56) References Cited

U.S. PATENT DOCUMENTS

| | | | |
|---|---|---|---|
| 4,894,861 A | 1/1990 | Fujioka |
| 4,924,496 A | 5/1990 | Figa et al. |
| 5,210,789 A | 5/1993 | Jeffus et al. |
| 5,220,599 A | 6/1993 | Sasano et al. |
| 5,265,145 A | 11/1993 | Lim |
| 5,446,785 A | 8/1995 | Hirai |
| 5,490,205 A | 2/1996 | Kondo et al. |
| 5,506,894 A | 4/1996 | Billings et al. |

(Continued)

FOREIGN PATENT DOCUMENTS

| | | |
|---|---|---|
| EP | 0876038 | 11/1998 |
| EP | 0920169 | 6/1999 |

(Continued)

OTHER PUBLICATIONS

"CNAM Definition from PC Magazine Encyclopedia," PC Magazine Encyclopedia, 1981-2011, pp. 1-2, The Computer Language Company Inc., http://www.pcmag.com/encyclopedia_term.

(Continued)

*Primary Examiner* — Kent Chang
*Assistant Examiner* — Scott Au
(74) *Attorney, Agent, or Firm* — Lowe Graham Jones PLLC

(57) ABSTRACT

Caller name (CNAM) query results obtained from a traditional CNAM service are sent during call processing on a carrier network to the subscriber's mobile handset over a Short Message Service (SMS) channel on a mobile carrier network. A call page is received at a network carrier associated with a recipient of the received call page. A caller name (CNAM) query is performed, and the result of the performed CNAM query is sent to the recipient device before sending the call page to the recipient device. The CNAM query result is displayed on a display of the recipient device.

5 Claims, 2 Drawing Sheets

(56) References Cited

U.S. PATENT DOCUMENTS

| | | | |
|---|---|---|---|
| 5,506,895 A | 4/1996 | Hirai et al. | |
| 5,546,447 A | 8/1996 | Skarbo et al. | |
| 5,727,057 A | 3/1998 | Emery et al. | |
| 5,734,706 A | 3/1998 | Windsor et al. | |
| 5,754,636 A | 5/1998 | Bayless et al. | |
| 5,771,283 A | 6/1998 | Chang et al. | |
| 5,805,677 A | 9/1998 | Ferry et al. | |
| 5,867,562 A | 2/1999 | Scherer | |
| 5,930,701 A | 7/1999 | Skog | |
| 5,982,867 A | 11/1999 | Urban et al. | |
| 6,046,687 A | 4/2000 | Janky | |
| 6,075,850 A | 6/2000 | Ali et al. | |
| 6,094,574 A * | 7/2000 | Vance et al. | 455/415 |
| 6,108,408 A | 8/2000 | Plunkett et al. | |
| 6,353,664 B1 | 3/2002 | Cannon et al. | |
| 6,366,670 B1 | 4/2002 | Davis et al. | |
| 6,449,351 B1 | 9/2002 | Moss et al. | |
| 6,643,516 B1 | 11/2003 | Stewart | |
| 6,714,639 B1 | 3/2004 | Bedingfield et al. | |
| 6,799,033 B2 | 9/2004 | Kanefsky | |
| 6,813,344 B1 | 11/2004 | Lemke | |
| 6,975,712 B1 | 12/2005 | Schnarel et al. | |
| 6,985,572 B2 | 1/2006 | Gosselin | |
| 7,016,482 B2 | 3/2006 | Moss et al. | |
| 7,085,257 B1 | 8/2006 | Karves et al. | |
| 7,155,211 B2 | 12/2006 | Mun et al. | |
| 7,170,984 B2 | 1/2007 | Gosselin | |
| 7,170,985 B2 | 1/2007 | Gosselin | |
| 7,200,212 B2 | 4/2007 | Gosselin | |
| 7,215,750 B2 | 5/2007 | Nguyen et al. | |
| 7,324,638 B2 * | 1/2008 | Mullis et al. | 379/211.02 |
| 7,388,949 B2 | 6/2008 | Contractor et al. | |
| 7,623,849 B2 | 11/2009 | Zellner | |
| 7,634,256 B2 * | 12/2009 | Sherman et al. | 455/415 |
| 7,756,259 B2 | 7/2010 | Martin | |
| 7,796,998 B1 * | 9/2010 | Zellner et al. | 455/456.1 |
| 7,839,987 B1 * | 11/2010 | Kirchhoff et al. | 379/142.02 |
| 2001/0001012 A1 | 5/2001 | Culli et al. | |
| 2002/0128012 A1 | 9/2002 | Kim et al. | |
| 2002/0159574 A1 | 10/2002 | Stogel | |
| 2003/0041030 A1 | 2/2003 | Mansfield | |
| 2003/0063730 A1 | 4/2003 | Woodring | |
| 2003/0092432 A1 * | 5/2003 | Hwang | 455/415 |
| 2003/0157929 A1 * | 8/2003 | Janssen et al. | 455/416 |
| 2004/0066920 A1 | 4/2004 | Vandermeijden | |
| 2004/0203943 A1 * | 10/2004 | Cai et al. | 455/466 |
| 2006/0089165 A1 | 4/2006 | Smith et al. | |
| 2006/0112167 A1 | 5/2006 | Steele et al. | |
| 2006/0234703 A1 | 10/2006 | Wuthnow et al. | |
| 2007/0064911 A1 * | 3/2007 | Bedingfield et al. | 379/221.09 |
| 2007/0127656 A1 | 6/2007 | Citron et al. | |
| 2008/0059642 A1 | 3/2008 | Bhogal et al. | |
| 2008/0240383 A1 | 10/2008 | Fronczak et al. | |
| 2008/0242293 A1 | 10/2008 | Gosselin | |
| 2009/0257575 A1 | 10/2009 | Gosselin et al. | |
| 2010/0222028 A1 | 9/2010 | Gisby et al. | |
| 2010/0261459 A1 | 10/2010 | Gosselin et al. | |
| 2010/0261461 A1 | 10/2010 | Gosselin et al. | |
| 2010/0261462 A1 | 10/2010 | Gosselin et al. | |

FOREIGN PATENT DOCUMENTS

| | | |
|---|---|---|
| EP | 1124387 | 8/2001 |
| EP | 1199899 | 4/2004 |
| EP | 1551201 | 7/2005 |
| GB | 2405768 | 1/2008 |
| JP | 4086144 | 3/1992 |
| JP | 4248739 | 9/1992 |
| JP | 09064960 | 3/1997 |
| JP | 9321856 | 12/1997 |
| JP | 10276257 | 10/1998 |
| JP | 2002044221 | 2/2002 |
| JP | 2002305602 | 10/2002 |
| JP | 2005198218 | 7/2005 |
| KR | 1020010027839 | 6/2001 |
| KR | 1020050071947 | 8/2005 |
| KR | 1020090043274 | 6/2009 |
| WO | 9717793 | 5/1997 |
| WO | 0229665 | 4/2002 |
| WO | 2004023767 | 3/2004 |
| WO | 2006024952 | 3/2006 |
| WO | 2007056577 | 5/2007 |
| WO | 2007095963 | 8/2007 |
| WO | 2008122052 | 10/2008 |
| WO | 2010120607 | 10/2010 |
| WO | 2010120610 | 10/2010 |

OTHER PUBLICATIONS

"Want to know Who's Calling? Hear the name and number announced before you answer!" ClassCo-The VoiceAnnounce Technology Company, 1 page, printed Mar. 25, 2011, http://www.voiceannounce.com.

"Calling Name Delivery (CNAM)," Cisco PGW 2200 Softswitch, Cisco Systems, 2007, pp. 1-13, http://www.cisco.com.

TIA TIA-764 TIA/EIA-41-D Enhancements for Wireless Calling Name Feature Descriptions, Telecommunications Industry Association; Jan. 1, 2002; IHS, Inc.; http://electronics.ihs.com/document/abstract; 1 page.

"Recommended GPS Navigator" Consumer Reports News, GPS and GPS Ratings from Consumer Reports, ConsumerReports.org, 2005-2011, pp. 1-2, http://news.consumerreports.org.

"GPS Location, Can Someone Track me on my Phone?" SprintUsers.com, Sep. 27, 2004, pp. 1-5, vBulletin, v.3.8.4, 2002-2007, Jelsoft Enterprises Ltd.

Nathalie Fiset, "Cellular GPS Phone Tracking," Ezine @rticles, Jan. 28, 2007, pp. 1-4, http://ezinearticles.com/?Cellular-GPS-Phone-Tracking&id=434437.

Matoba, N. and Yoshida, S. (1996), "Still image transmission using unequal error protection coding in mobile radio channel. Electronics and Communications in Japan (Part 1: Communications)," Mar. 23, 2007, 79: 75-85. http://onlinelibrary.wiley.com/doi/10.1002/ecja.4410790408/abstract.

"Show Your Facebook or MySpace Pic as Picture Caller ID!" PicDial Make Your Address Book Socially Aware!, Mar. 25, 2011, IQzone, Inc.; http://www.picdial.com.

"Frequently Asked Questions About Mobile to Mobile Calling," Residential Support Wireless Phone, 2011, Verizon, http://wireless-support.verizon.com/faqs/Calling+Plans/faq_in_calling.html.

"Sprint Cell Phone Reverse Lookup Downloads," FileHeap! Where People Get Files, pp. 1-4, 2000-2010, http://www.fileheap.com/dbquery/1/sprint+cell+phone+reverse+lookup+downloads.

Berg, Andrew; "Tap Me Offers In-Game Ad Platform," Wireless Week, pp. 1-2, Feb. 28, 2011, http://www.wirelessweek.com/News/2011/02/Business-TapMe-In-Game-Ad-Platform-Mobile-Content/.

VeriSign Authentication Services—The Leading Provider of SSL. printed Mar. 25, 2011, Symantec Corporation, http://www.verisign.com; cc 2011.

Wireless, Wherify.com, www.wherify.com/html/faq.asp?pageID=13; 1 page, printed Mar. 29, 2011; cc 2011.

* cited by examiner

DELIVERY OF CALLER IDENTIFICATION DATA TO A MOBILE DEVICE USING APPLICATION DIRECTED SHORT MESSAGING SERVICE

PRIORITY CLAIM

This application claims the benefit of U.S. Provisional Application Ser. No. 61/099,112 filed Sep. 22, 2008, the contents of which are hereby incorporated by reference.

BACKGROUND OF THE INVENTION

On wireless networks, certain mobile devices are not enabled to receive CNAM (CNAM is an online information service providing caller name ID to telecommunications providers) caller ID display text information, and certain carrier network mobile switching centers (MSCs) are not CNAM transport-capable. Thus, CNAM query results from the carrier cannot be provided to the mobile device in the call page.

Other handset initiated communication facilities, such as SDB (Short Data Burst)/DOS (Data Over Signaling) on Code Division Multiple Access (CDMA) networks may be unavailable after the call page has been sent. Certain Global System for Mobile Communications (GSM) networks have similar limitations.

SUMMARY OF THE INVENTION

This invention delivers caller name (CNAM) query results obtained from a traditional CNAM service during call processing on a carrier network to the subscriber's mobile handset over a Short Message Service (SMS) channel on a mobile carrier network.

In an example method a call page is received at a network carrier associated with a recipient of the received call page. A caller name (CNAM) query is performed, then the result of the performed CNAM query is sent to the recipient device via SMS before sending the call page to the recipient device to initiate a call. The CNAM query result is displayed on a display of the recipient device.

In one aspect of the invention, a data message is sent to the recipient device using a Short Message Service Center (SMSC). The data message includes the result of the performed CNAM query.

In another aspect of the invention, a confirmation is generated if the sent data message has been received and the call page is released to the recipient device after generation of the confirmation.

In still another aspect of the invention, the CNAM query includes searching for CNAM information in a Line Information Database (LIDB) using caller identification (CID) included with the call page.

These and other examples of the invention will be described in further detail below.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
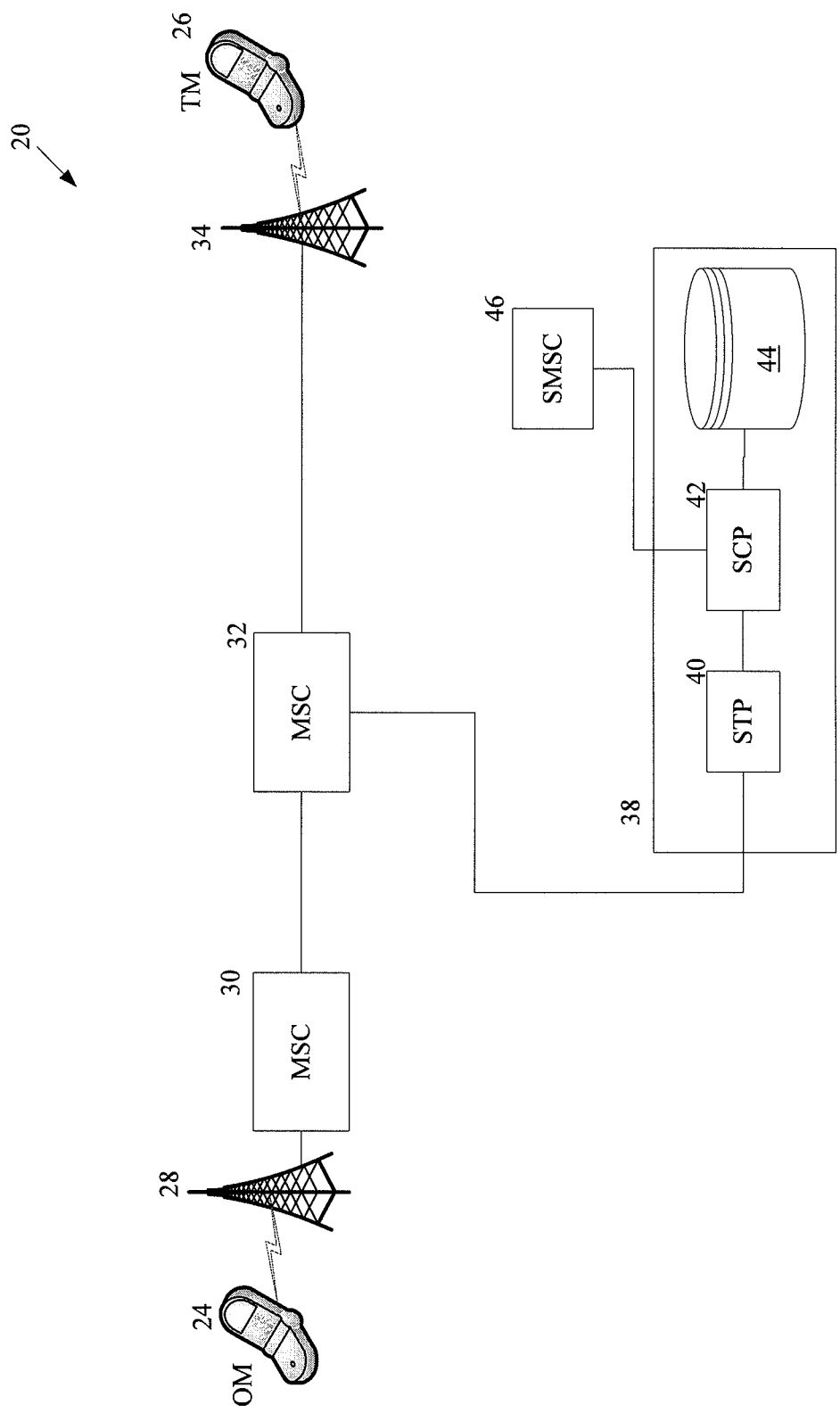
FIG. 1 illustrates architecture of an example system formed in accordance with an embodiment of the present invention.

FIG. 1 is a schematic diagram of an example system 20 that performs an improved caller name (CNAM) process. The system 20 includes a call originating device (handset OM) 24, a call originating base station (BS) 28, an originating carrier (a first Mobile Switching Center (MSC)) 30, a terminating carrier (a second MSC) 32, terminating carrier components 38, a terminating BS 34, a terminating carrier short message service center (SMSC) 46, and a terminating handset 26 (TM).

The present invention suspends a call page at the network level (the second MSC 32), processes a CNAM query at the carrier components 38, and delivers the CNAM query results to the subscriber's mobile device (the terminating handset 26) via an application directed SMS sent via the terminating carrier's messaging gateway (the SMSC 46) and the terminating BS 34.

The carrier components 38 include a Service Transfer Point (STP) 40 and a Service Control Point (SCP) 42 that provides a CNAM service using a Line Information Database (LIDB) 44. After the call page is suspended, a CNAM request is sent to the SCP 42 via the STP 40. The SCP 42 queries the LIDB 44. If a result of the query is found, the SCP 42 instructs the carrier SMSC 46 to send an SMS message to the terminating handset 26. The SMS message includes the CNAM query result. Then the CNAM components 38 instruct the second MSC 32 to release the call page to the terminating handset 26.

After the terminating handset 26 receives the call page via the terminating BS 34 and the CNAM information via the terminating BS 34 and the SMSC 46, the CNAM information is displayed with the originating caller number (CID).

Figure 2:
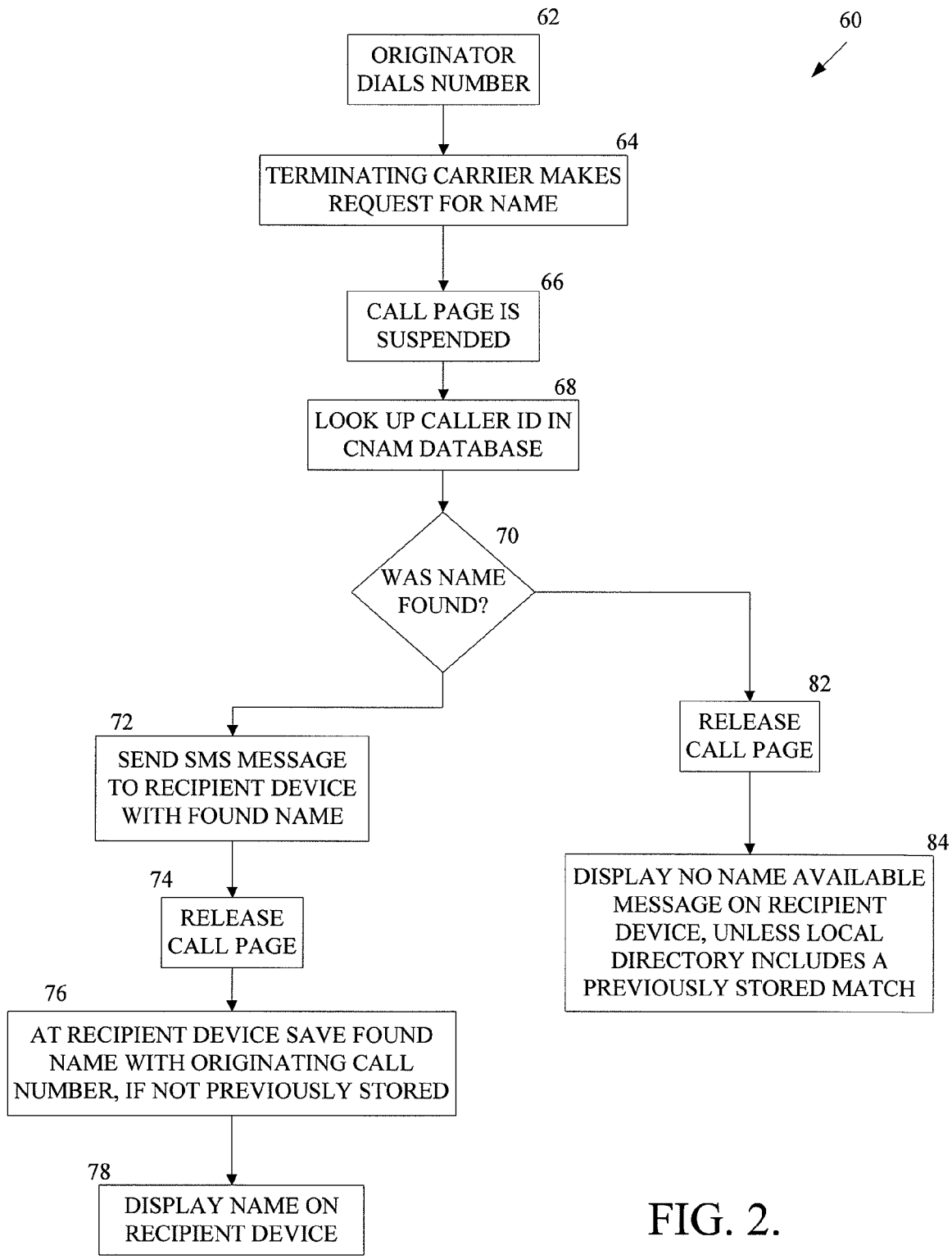
FIG. 2 illustrates a flow diagram of example process performed by the system of FIG. 1.

FIG. 2 illustrates an example process 60 that will deliver caller name information (CNAM) to the subscriber on the first call, other than traditional in-network CNAM sending (CID, Name) in the display text field of the call page.

First, at a block 62, an originating caller dials a number for a subscriber. The incoming call page is received at a Network Control Point (NCP) (i.e. the MSC 32).

The MSC 32 begins a CNAM query to obtain caller information from the LIDB 44 based on caller's CID at block. At a block 66, the SCP 42 and MSC 32 suspend the call page during the CNAM query. At a block 70, the CNAM query result is returned to the SCP 42 from the CNAM service LIDB 44. The CNAM result (typically, compressed text containing the caller name and CID) is delivered by the carrier SMSC 46 to the BS 34 and the mobile device 26 via an application directed SMS, see block 72. Then, at a block 74, after notification of SMS receipt from the SMSC 46 or expiration of a time limit, the SCP 42 instructs the MSC 32 to release the call page. The carrier MSC 32 sends the call page to the subscriber's mobile device/base station (26, 34). The subscriber's mobile device 26 receives the call page. The device 26 includes a local application that displays related CNAM information that was received in the SMS message (i.e., 'John Doe 206-555-1212'), see block 78.

In one embodiment, the device 26 includes a mobile client application that stores the contents of the received SMS message in the contact directory of the device 26, see block 76. Referencing the previously filed application, the contact list may be used to filter CNAM queries for those phone numbers already known to the TM subscriber.

When the mobile device 26 receives the incoming call, the contact information is retrieved from the contact directory and displays caller's number and name during incoming call sequence.

In another embodiment, the SMS message content is held in temporary memory on the mobile device 26. When the mobile device 26 receives the incoming call page, the mobile device 26 retrieves contact information from the temporary memory and displays the caller's number and name during an incoming call sequence.

If no name was found in the CNAM query of the LIDB 44, a "null" output is produced. The MSC 32 is instructed to release the call page (82) and that a "null" situation has occurred. The system may at that point choose to send a blank caller information result in the call page text display field, or to send no caller information result at all. When the call page is received at the device 26 and either "null" information is included with the call page or with an SMS message or no SMS message was received, no name is displayed unless the local memory of the device 26 includes a name associated with the call page (84). The CID in the call page will be received and displayed in the caller ID text display field, in either case.

While a traditional query to a CNAM SCP suspends the call page in the literal sense, other network facilities may be used to effectively accomplish the same result. Whether the call page is literally suspended, delayed, or the query is placed early enough in the process with sufficient time to receive a result and send a SMS, the goal is the same: to have the SMS arrive at the handset before the call page. This permits first-call caller identification.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
   receiving a call page at a network carrier associated with a receiving mobile device of the call page;
   performing a caller name (CNAM) query at the network carrier after receipt of the call page;
   sending the result of the performed CNAM query to the receiving mobile device as a Short Message Service (SMS) message before sending the call page to the receiving mobile device;
   receiving confirmation of receipt of the SMS message by the receiving mobile device;
   in response to receiving confirmation of receipt of the SMS message, sending the call page to the receiving mobile device;
   storing, on the mobile device, information from the SMS message;
   receiving, on the mobile device, the call page after receiving the SMS message;
   in response to receiving the call page, retrieving, on the mobile device, the information from the SMS message; and
   displaying the information from the SMS message as part of an incoming call sequence in response to the call page on the mobile device.

2. The method of claim 1, further comprising:
   receiving confirmation at the network carrier that the SMS message has been received at the receiving mobile device; and
   releasing the call page to the receiving mobile device after receipt of the confirmation.

3. The method of claim 1, wherein performing the CNAM query comprises searching for CNAM information in a Line Information Database (LIDB) using caller identification (CID) included with the call page.

4. The method of claim 1, further comprising storing the SMS message on the receiving mobile device.

5. The method of claim 1, further comprising filtering out CNAM queries based on a directory of numbers previously stored on the receiving mobile device.

\* \* \* \* \*